US011731301B2

(12) United States Patent
Ebert

(10) Patent No.: US 11,731,301 B2
(45) Date of Patent: Aug. 22, 2023

(54) LEVER-TRANSLATED CUTTING DEVICE

(71) Applicant: WOLFCRAFT GMBH, Kempenich (DE)

(72) Inventor: Winfried Ebert, Weibern (DE)

(73) Assignee: WOLFCRAFT GMBH, Kempenich (DE)

( * ) Notice: Subject to any disclaimer, the term of this patent is extended or adjusted under 35 U.S.C. 154(b) by 144 days.

(21) Appl. No.: 17/623,827

(22) PCT Filed: Apr. 2, 2020

(86) PCT No.: PCT/EP2020/059335
§ 371 (c)(1),
(2) Date: Dec. 29, 2021

(87) PCT Pub. No.: WO2020/201397
PCT Pub. Date: Oct. 8, 2020

(65) Prior Publication Data
US 2022/0250270 A1  Aug. 11, 2022

(30) Foreign Application Priority Data
Apr. 2, 2019 (DE) .................... 10 2019 108 632.9

(51) Int. Cl.
*B26D 1/30* (2006.01)
*B23D 17/08* (2006.01)
*B26D 5/10* (2006.01)

(52) U.S. Cl.
CPC .............. *B26D 1/30* (2013.01); *B23D 17/08* (2013.01); *B26D 5/10* (2013.01)

(58) Field of Classification Search
CPC . B26D 1/30; B26D 1/305; B26D 5/10; B26D 5/18; B23D 17/08; Y10T 83/8807; Y10T 83/8808
See application file for complete search history.

(56) References Cited

U.S. PATENT DOCUMENTS 291,775 A * 1/1884 Rice ..................... B21D 28/002
83/590
804,579 A * 11/1905 Burgess ................. B23D 17/06
83/601

(Continued)

FOREIGN PATENT DOCUMENTS

CN    203993976 U   12/2014
DE      319174 C    2/1920
(Continued)

*Primary Examiner* — Jennifer S Matthews
(74) *Attorney, Agent, or Firm* — Lucas & Mercanti, LLP; Klaus P. Stoffel

(57) ABSTRACT

A cutting device, including a frame, a cutting blade, which is fastened to the frame for pivoting about a first pivot axis, and a reduction transmission, which converts each forward pivoting movement of a plurality of successively performed forward pivoting movements and backward pivoting movements of a drive arm into a cutting pivoting movement of the cutting blade. A cutting-blade back-pivoting apparatus is provided, by which the cutting blade can be pivoted back from a pivoting end position to an initial position. The back-pivoting apparatus has, in particular, a tension element, which acts on the cutting blade in such a way that a clearance is formed.

11 Claims, 5 Drawing Sheets

(56) References Cited

U.S. PATENT DOCUMENTS

| | | | |
|---|---|---|---|
| 1,814,790 A | | 7/1931 | Edwards |
| 2,129,352 A | | 9/1938 | Haralson |
| 4,055,891 A | | 11/1977 | Wick |
| 4,300,425 A | * | 11/1981 | Wozniak ................ B23D 17/08 |
| | | | 83/603 |
| 2004/0089126 A1 | * | 5/2004 | McLean ................ B26D 7/025 |
| | | | 83/605 |
| 2008/0022531 A1 | * | 1/2008 | Yamakado ............... B26D 5/18 |
| | | | 30/92 |
| 2011/0303067 A1 | * | 12/2011 | Chiang .................. B26D 1/305 |
| | | | 83/646 |
| 2011/0308097 A1 | | 12/2011 | Vollrath |

FOREIGN PATENT DOCUMENTS

| | | | | |
|---|---|---|---|---|
| DE | 363991 | C | 11/1922 | |
| DE | 947218 | C | 8/1956 | |
| DE | 8313615 | U1 | 9/1983 | |
| DE | 3631162 | A1 | 3/1988 | |
| DE | 102010016459 | A1 * | 10/2011 | ........... B26D 1/0006 |
| EP | 2454058 | B1 | 8/2013 | |
| KR | 20100049461 | A * | 5/2010 | |
| WO | 2010010169 | A1 | 1/2010 | |

\* cited by examiner

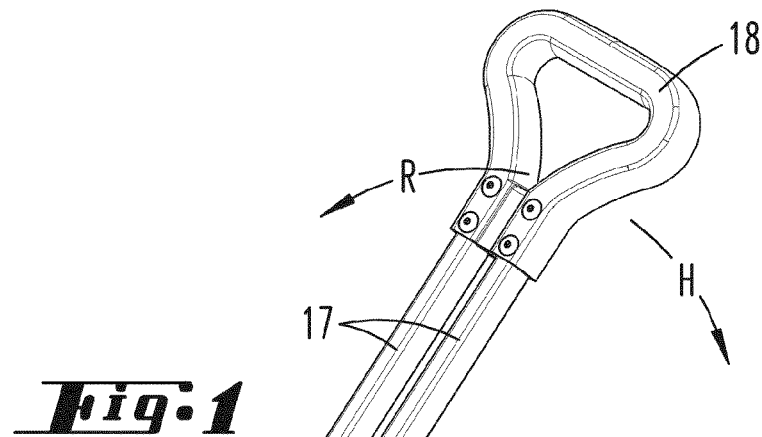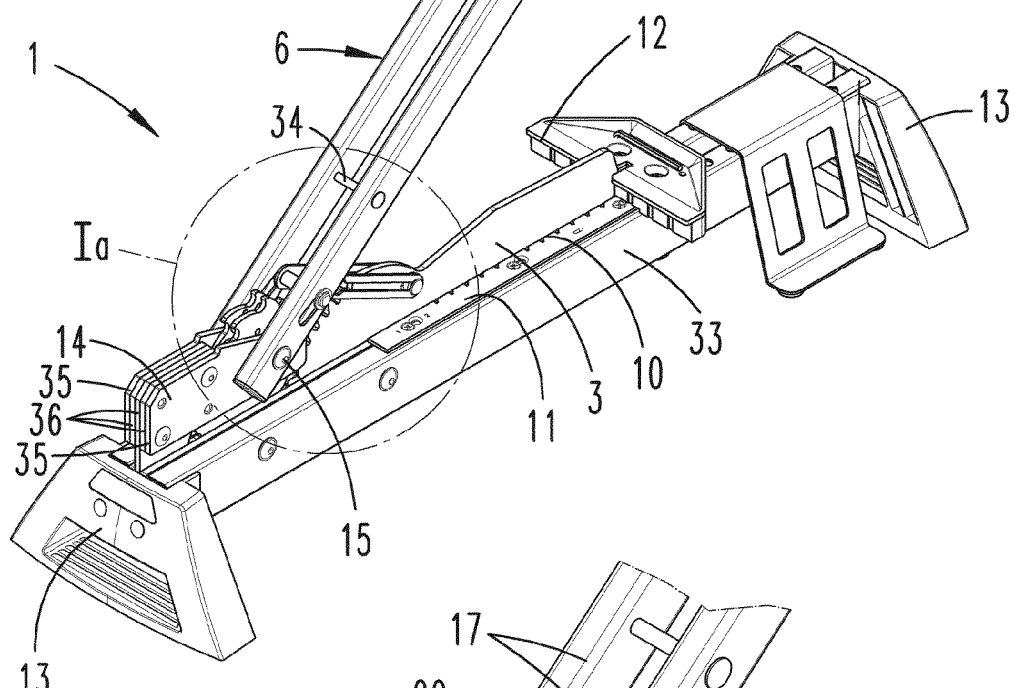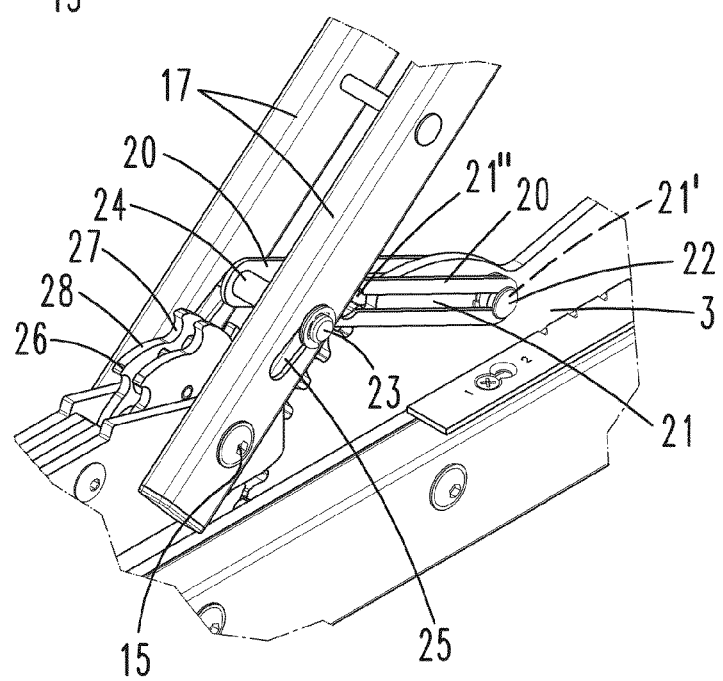

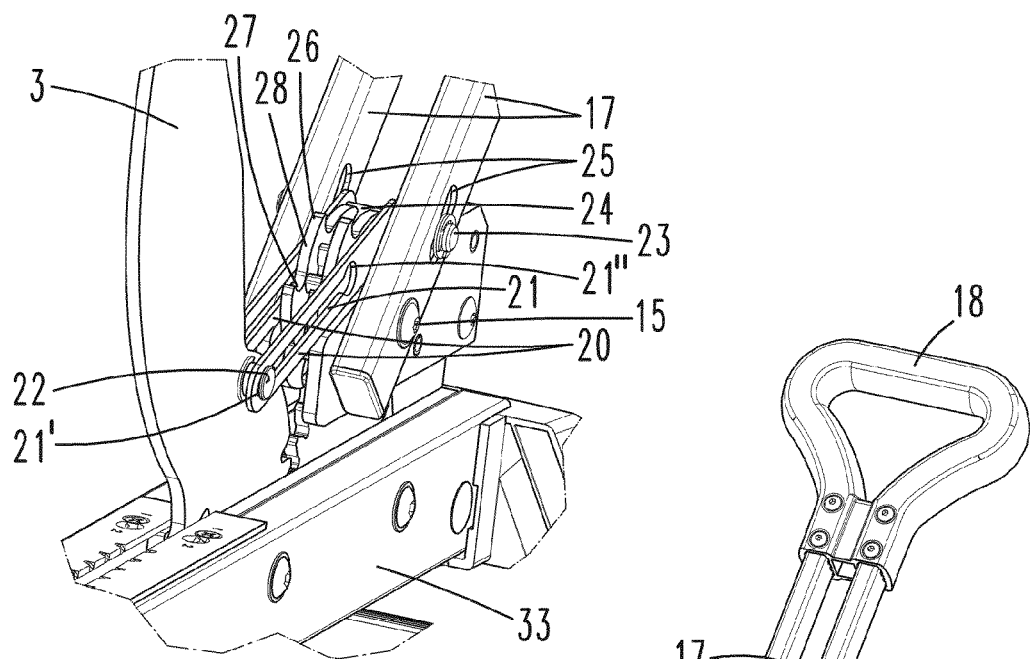
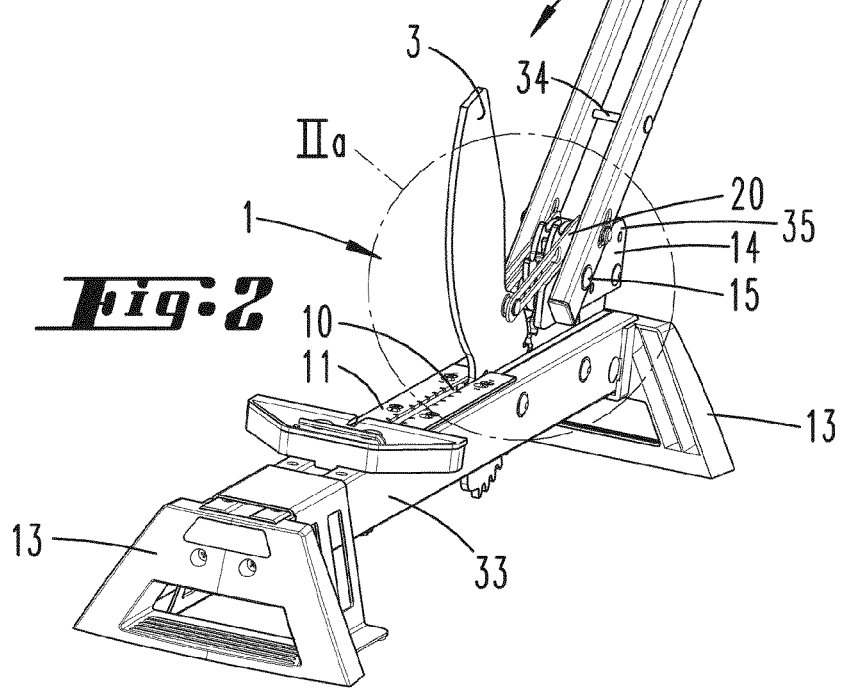

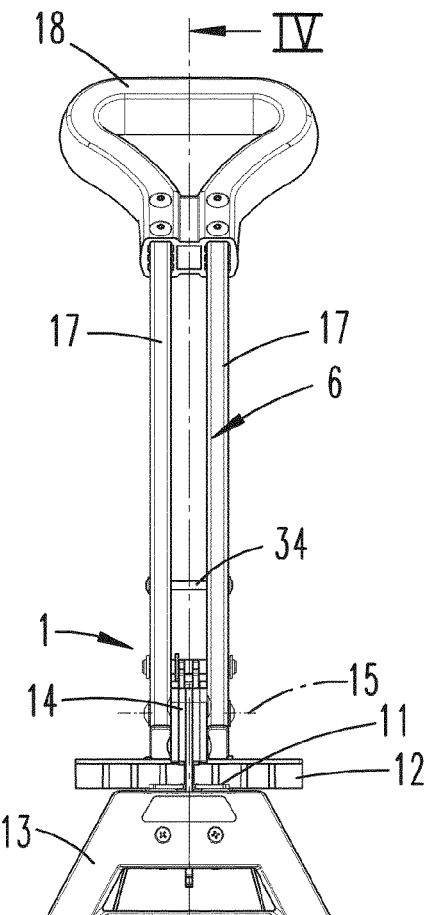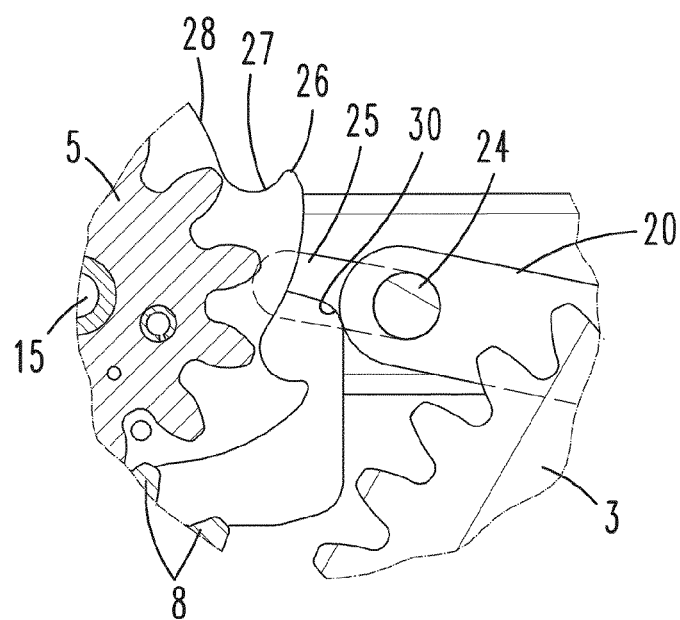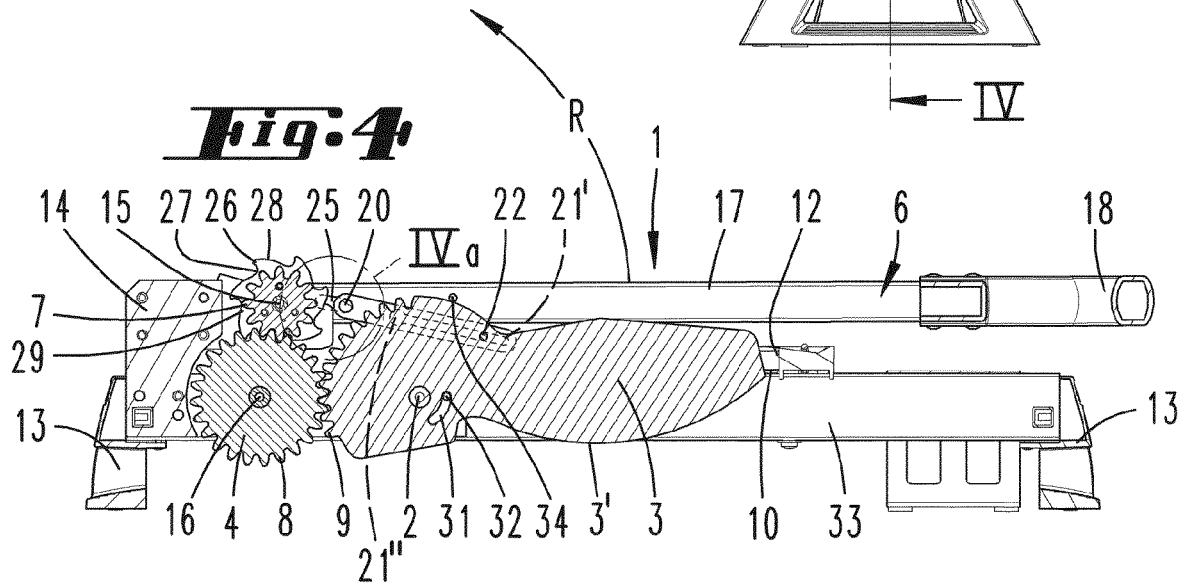

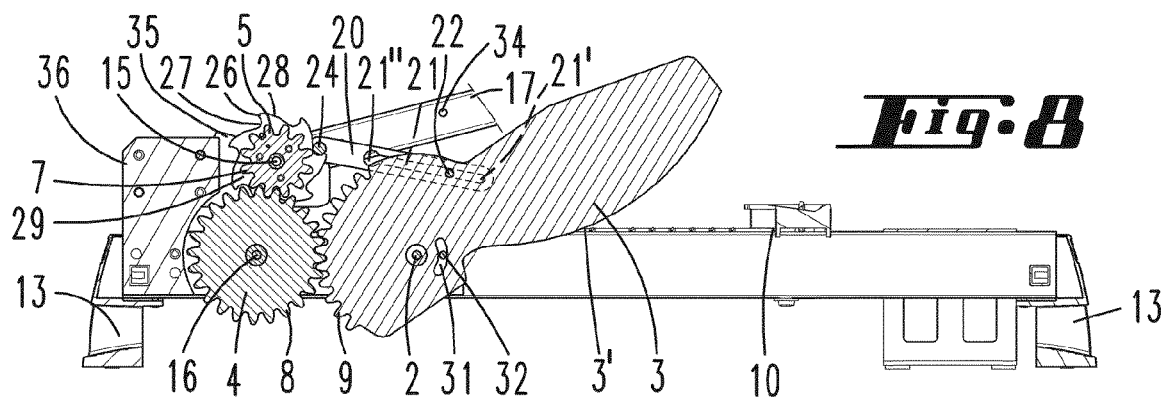
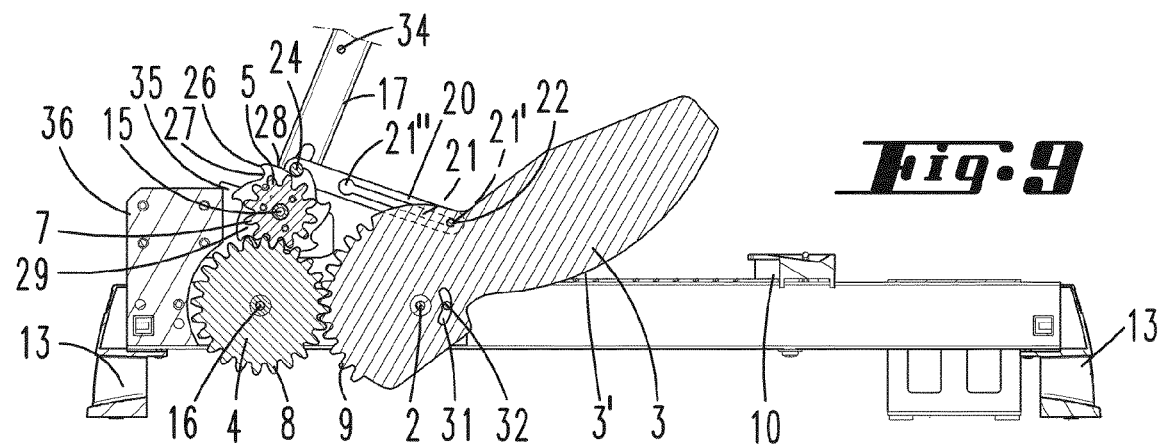
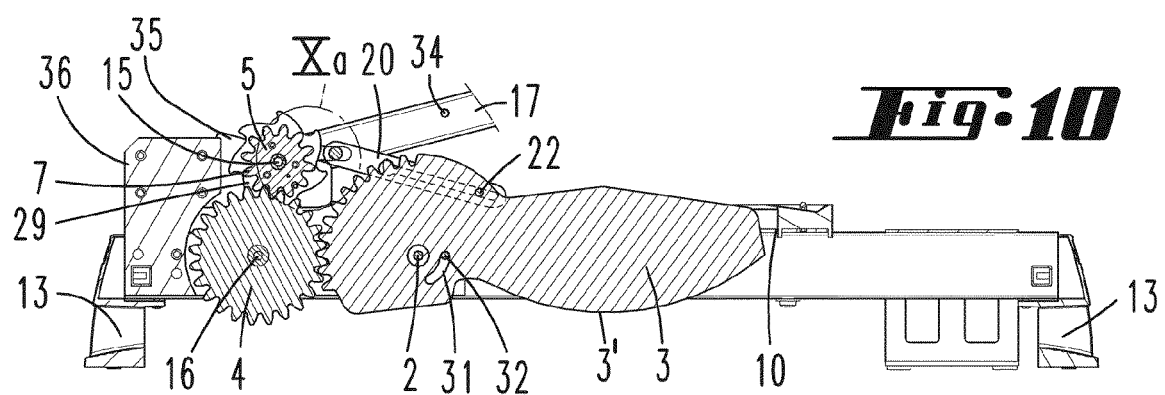
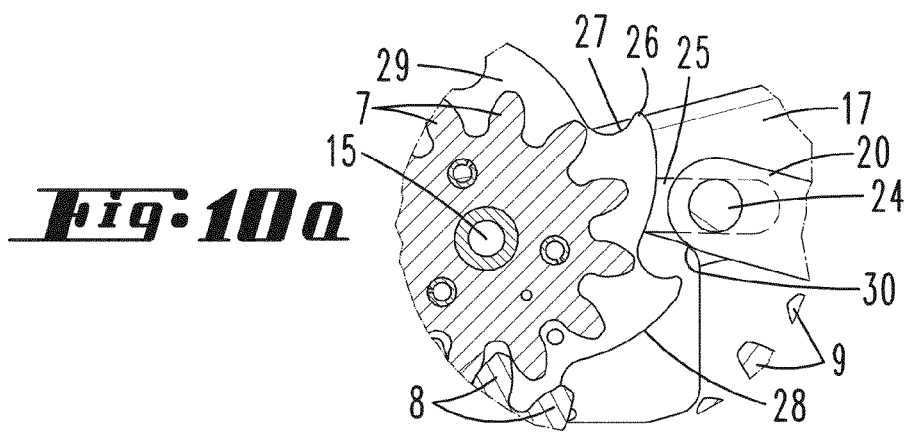

LEVER-TRANSLATED CUTTING DEVICE

CROSS-REFERENCE TO RELATED APPLICATIONS

The present application is a 371 of International application PCT/EP2020/059335, filed Apr. 2, 2020, which claims priority of DE 10 2019 108 632.9 filed Apr. 2, 2019, the priority of these applications is hereby claimed and the applications are incorporated herein by reference.

BACKGROUND OF THE INVENTION

The invention relates to a cutting device comprising a frame, a cutting blade, which is fastened thereto so as to be able to pivot about a first pivot axis, and a reduction gear, which in each case converts the forward pivoting movement of several successively performed forward and backward pivoting movements of a drive arm into a cutting pivoting movement of the cutting blade, wherein the cutting blade, which is pivoted from an initial position into a cutting end position, can be brought back into the initial position by means of a cutting blade backward pivoting means.

PRIOR ART

U.S. Pat. No. 4,300,425 describes a generic cutting device. A cutting blade, which can be pivoted about a pivot axis, has a toothing forming drive flanks. By pivoting a drive arm, a blocking element fastened to the drive arm can engage with the drive flank in order to in each case convert the forward pivoting movement of several successively performed forward and backward pivoting movements into a cutting pivoting movement of the cutting blade.

DE 319 174 describes a cutting device comprising a reduction gear. The cutting device described therein has a fixed jaw and a movable jaw, which can be pivoted about an axis of rotation with respect to the fixed jaw and which has a sector gear, with which a gear wheel engages, which can be coupled in a rotationally fixed manner to a drive arm via a ratchet. After a pivoting movement of the drive arm, a pawl can hold the movable jaw in a pivot position. By actuating a foot lever, the pawl can be released, so that the movable jaw can pivot back in an initial position due to its dead weight.

U.S. Pat. No. 4,055,891 describes a cable cutter comprising a latching pawl, which can engage with a circumferential toothing of a movable cutting jaw. By forward and backward pivoting a drive arm, the movable cutting jaw can be displaced step by step towards a fixed cutting jaw. By retracting the latching pawl, it is disengaged in the circumferential toothing, so that a reverse rotation of the movable cutting jaw is possible.

DE 8313615 U1 describes a cutting device comprising a lifting cylinder, by means of which a movable cutting jaw can be pivoted with respect to a fixed cutting jaw. A tension spring is provided for returning the cutting jaw into the initial position.

In the case of the cutting device described by U.S. Pat. No. 1,814,790, the backward pivoting of the cutting edge occurs by means of its dead weight.

Lever-translated cutting devices, in the case of which a drive arm rotates a first wheel of a reduction gear, which has a toothing, which engages with a counter toothing of a cutting blade, by interconnecting a pawl gear, are known from DE 947 218, DE 363 991, DE 36 31 162, and DE 319174.

WO 2010/010169 A1 and CN 203993976 U describe cutting devices, in the case of which a cutting wheel can be rotated step by step by pivoting a drive arm.

SUMMARY OF THE INVENTION

The invention is based on the object of further developing a generic cutting device in a manner, which is advantageous for use.

First of all and primarily, it is proposed that the blocking element can be displaced in an elongated hole of the drive arm and couples the drive arm to a first wheel of a reduction gear during the forward pivoting movement. The invention further proposes that the cutting blade backward pivoting means couples the drive arm to the cutting blade. The cutting blade can be brought back into the initial position by means of a backward pivoting movement of the drive arm. The coupling takes place in such a way that the cutting blade is entrained by the drive arm during the backward pivoting of the drive arm. The cutting blade, which has been brought from an initial position into a cutting end position during the cutting movement, can be brought back into the initial position by means of preferably a single backward pivoting movement by means of this cutting blade backward pivoting means. As a result of this design, a cutting device comprising a frame, a cutting blade, which is fastened thereto so as to be able to pivot about a first pivot axis, comprising a reduction gear, which converts the forward pivoting movement of forward and backward pivoting movements, which are performed successively several times, of a drive arm into a cutting pivoting movement of the cutting blade, can be handled like a cutting device, in the case of which the drive arm is fastened directly to the cutting blade. A larger cutting force can nonetheless be applied to the cutting blade by means of the reduction gear. The cutting device according to the invention can be designed as laminate cutter and can have a frame, which has the characteristics, which are described in DE 10 2009 003 490 A1. The frame consists of two carriers running parallel to one another, which are preferably formed as hollow bodies. They can be box-shaped extrusion parts. Feet, by means of which the frame can be applied to a surface, are attached on the two ends. A gap, into which the cutting blade preferably having a blunt cutting edge can enter, extends between the two carriers, which run parallel to one another and to which the reduction gear is fastened, in order to punch a material strip out of a laminate plate or the like, which has been placed onto a bearing. The gap width of the gap is preferably only slightly wider than the material thickness of the cutting blade, which is made of a sheet plate. The reduction gear can have a first wheel with a small diameter, which engages with a toothing. This toothing is preferably formed by a second wheel, which can have a larger diameter than the first wheel. The rotational movement of the first wheel is transferred to a toothing of the cutting blade, which extends on a circular arc, the radius of which is larger than the radius of the toothing of the first wheel. The reduction gear preferably has an odd number of gear wheels, so that the direction of rotation of the first wheel corresponds to the direction of rotation of the cutting blade. A type of ratchet-and-pawl mechanism is provided, which transfers a forward pivoting movement of the drive arm to the reduction gear, but not a backward pivoting movement. As a result of this, only the backward pivoting movement of the forward and backward pivoting movements, which are performed successively several times, of the drive arm is in each case transferred to the cutting blade, so that the cutting blade can be displaced step by step from an initial position, in which the cutting device quasi assumes an open position, into a cutting end position, in which the cutting edge of the cutting blade is entered completely into the gap. From this cutting end position, the cutting blade can be pivoted back into the initial position by means of the cutting blade backward pivoting means according to the invention. In particular a coupling member is provided for this purpose, by means of which the drive arm is coupled to the cutting blade. The coupling member is preferably a tension element, by means of which a tension can be exerted on the cutting blade, when the drive arm is pivoted back opposite to the forward pivoting movement. In particular a pivoting clearance is provided. Within this pivoting clearance, the drive lever can be pivoted back and forth with a first, in particular small amplitude, in order to pivot the cutting blade in the cutting direction. Following the cutting process, the cutting blade can be displaced back into an initial position with an in particular larger amplitude or a larger backward pivoting path, respectively. The coupling member, by means of which the drive arm is coupled to the cutting blade, has in particular a pivoting clearance, which takes effect during the cutting during the displacement of the cutting blade. The pivoting clearance can be formed by a first elongated hole, in which a follower can move. The elongated hole can be arranged in the coupling member. It can extend in a straight line or on a curved line. However, the elongated hole can also be arranged in the cutting blade or in the first wheel or in a drive wheel. A follower, which engages with the elongated hole, can move back and forth during the cutting movement, which is performed with smaller amplitude. A blocking element can be provided, which fulfills the function of a pawl in a pawl gear. This blocking element is preferably assigned to the drive arm. The drive arm can have a second elongated hole, in which the blocking element can displace back and forth between a power transmission position and a release position. In the power transmission position, the blocking element abuts against a drive toothing of a drive tooth. The drive tooth is preferably part of a drive wheel having a plurality of drive teeth. The drive wheel can be connected in a rotationally fixed manner to the first wheel of the reduction gear. During the forward pivoting movement, the drive tooth lies in the force transmission position. The drive tooth has a rearward flank, which can form a curved control cam, by means of which the blocking element is displaced during the backward pivoting movement from the force transmission position into a release position, in which the blocking element can pass over one or several drive teeth during the backward pivoting movement, so that the cutting blade can be pivoted step by step from its initial position into its cutting end position with two or more strokes of the drive arm. In a preferred design, the blocking element is simultaneously also fastening element, by means of which the coupling member, which is preferably a tension element, is fastened to the drive arm. The fastening member, by means of which the coupling member is fastened to the drive arm, is preferably arranged at a first end of the coupling member. The second end of the coupling member can be formed by a first end of the first elongated hole, in which a second fastening member can move, by means of which the coupling member is fastened to the cutting blade. The second fastening member can move back and forth between the first end of the first elongated hole and a second end of the first elongated hole, when the cutting blade is rotated in the cutting direction by way of the forward and backward pivoting movement of the drive arm. To pivot the cutting blade from the cutting end position or an intermediate position between initial position and cutting end position back into the initial position, the drive arm is displaced so far in the backward pivoting direction, until the follower, which engages with the first elongated hole and which is preferably formed by a fastening member, abuts against the first end of the elongated hole. During the further pivoting of the drive arm, a tension can then be exerted on the cutting blade via the coupling member, which pivotably displaces the cutting blade. It turns out to be advantageous thereby when the fastening member is formed by the blocking element or can displace together with the blocking element in the second elongated hole, which is arranged in the drive arm, respectively. The second elongated hole can extend in such a direction, preferably even obliquely to the direction of extension of the drive arm, that the force transferred to the coupling member holds the blocking element in the release position. As a result of this measure, the drive teeth of the drive wheel can rotate freely underneath the blocking element when the cutting blade is pivoted back. It is thus not required that a drive wheel has to be decoupled from the reduction gear during the backward pivoting of the drive arm for displacing the cutting blade into the initial position. It is preferably provided that the direction of extension of the second elongated hole is selected in such a way that the blocking member is displaced from the release position back into the force transmission position only when the cutting blade is displaced completely back into the initial position or the pivoting direction is changed, respectively. In the case of a change of the pivoting direction from the backward pivoting movement into the forward pivoting movement, the blocking element moves back into its force transmission position in the second elongated hole. In an end position, the blocking element can also be displaced from the force transmission position into the release position, so that the drive arm can be brought into a parallel position to the carrier, which is formed by the frame. The cutting device thus reaches a compact storage position, in which the cutting blade additionally assumes its cutting end position. In a further development of the invention, means for limiting the pivoting of the cutting blade can be provided. They can be stop means. The cutting blade preferably has a curved slot, with which a stop pin engages, which is fastened to the frame. In the initial position and in the pivoting end position, the stop pin in each case abuts against an end of the curved slot. It can be provided in a further development that the toothing of the first wheel engages with the same toothing of the second wheel, with which a toothing of the cutting blade engages as well. The cutting blade can be mechanically formed by a two-armed lever, wherein the lever arms essentially lie diametrically opposite one another. A lever arm forms the curved cutting edge, which forms a point of intersection, which moves along the slit, during the cutting movement. The other lever arm forms a toothing, which is part of the reduction gear and which preferably meshes with the toothing of the second wheel, which also meshes with the toothing of the first wheel. The cutting blade, the second wheel, and the first wheel preferably lie in a common plane. The second wheel can rotate in the gap, into which the cutting blade plunges during the cutting movement. The first wheel can be connected in a rotationally fixed manner to two drive wheels, wherein the first wheel is arranged between the two drive wheels. The drive arm can have two bars, which run in a straight line, between which the two drive wheels are arranged. Two coupling members, which are fastened to the two broad sides of the cutting blade located opposite one another, can furthermore be located in the distance space between the two bars. A handle can be arranged on the free end of the two bars. The tension element can be formed by two pull rods or handle bars, which run in a straight line. The pivot axis of the drive arm can be supported by a small bearing block, which also supports the first wheel of the reduction gear. A stop can further be provided, which is fastened to the frame. The cutting blade plunges into the stop area by area, so that a laminate plate, which rests on the bearing and which is supported on the stop, can be divided by the cutting blade. A point of intersection thereby moves from a position, which lies at a distance from the stop, in the direction of the stop.

BRIEF DESCRIPTION OF THE DRAWINGS

An exemplary embodiment of the invention will be described in more detail below on the basis of enclosed drawings, in which:

FIG. 1 shows a first perspective illustration of a cutting device, in which the cutting blade is in a cutting end position, FIG. 1a shows the section Ia in FIG. 1, FIG. 2 shows a second perspective illustration of the cutting device, in the case of which the cutting blade 3 is in an initial position, in with Amended Pages Incorporated Therein which a plate to be cut, for example laminate or PVC plate, can be placed onto a bearing 11, FIG. 2a shows the section IIa in FIG. 2 in an enlarged manner, FIG. 3 shows a view, FIG. 4 shows the cutting device cut along the cutting line IV-IV in FIG. 3, but in a storage position, in which the drive arm 6 extends parallel to the frame 1, FIG. 4a shows the section IVa in FIG. 4 in an enlarged manner, FIG. 8 shows a follow-up illustration according to a first pivot stroke of the drive arm 6 in a forward pivoting direction H, in the case of which the first wheel 5 of a reduction gear has been rotationally entrained, and the reduction gear has displaced the cutting blade 3 in the cutting direction, FIG. 9 shows a follow-up illustration, according to which the drive arm has been pivoted back in backward pivoting movement R, but the cutting blade 3 has retained its pivot position, FIG. 10 shows a follow-up illustration after a second pivot stroke in the forward pivoting movement H, in which the cutting blade 3 has been pivoted all the way into a pivot end position; the drive arm 6 can be pivoted further from this position into the storage position illustrated in FIG. 4, FIG. 10a shows the section Xa in FIG. 10 in an enlarged manner.

DESCRIPTION OF THE EMBODIMENTS

Figure 5:
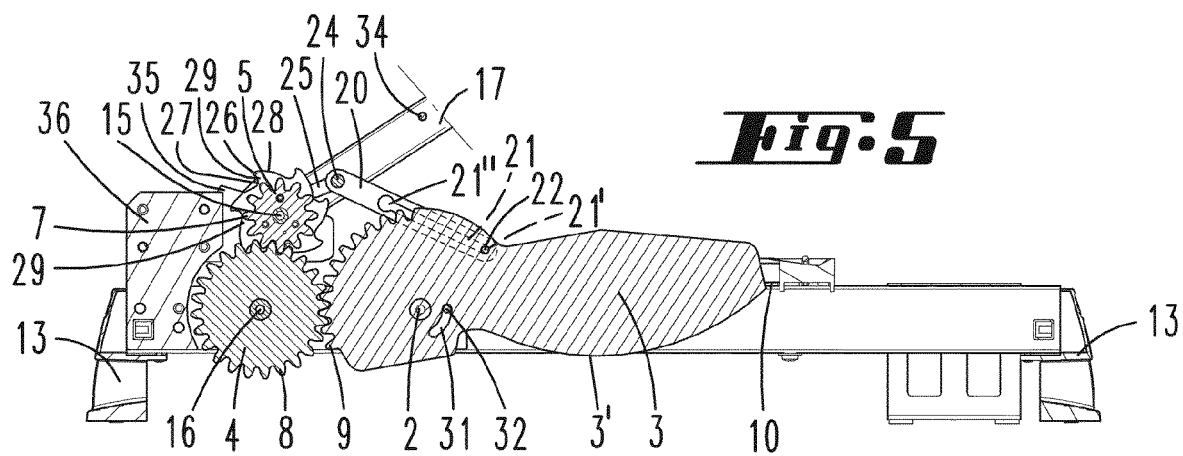
FIG. 5 shows a follow-up illustration to FIG. 4, wherein the drive arm 6 is pivoted so far in the direction of a backward pivoting movement that a fastening member 22 having the function of a follower lies on an end 21' of an elongated hole 21 of a coupling member 20, so that a blocking element 24 of a ratchet-and-pawl mechanism assumes its release position.

The cutting device has a frame 1, which has essentially two carriers formed as hollow bodies, which run parallel to one another and form a bearing 11 for a workpiece. A gap 10, into which a cutting blade 3 can plunge with a cutting edge 3', extends between the two carriers. On their two ends, the carriers are connected to one another by means of end pieces. The two end pieces are formed by feet 13, by means of which the frame can be supported on a surface in such a way that the two carriers pivot freely above the surface, so that the cutting edge 3' of the cutting blade 3 can plunge through the carriers.

A drive arm, which can be pivoted about a pivot axis 15 and which is formed from two strips 17 running parallel to one another, is fastened to a bearing block 14, which is fastened to the frame 11. A handle 18 is located at the end of the drive arm 6.

The bearing block 14 supports two drive wheels 29, between which a first wheel 5 is located, which is fastened in a rotationally fixed manner to the drive wheels 29, of a reduction gear. The drive wheels 29 can be pivoted about a pivot axis 15 together with the first wheel 5. The bearing block 14 preferably consists of a plurality of plates, which abut against one another, wherein two outer bearing plates 35 support the pivot axis 15, and a plurality of spacer plates 36 are arranged between the bearing plates 35.

The two drive wheels 29 form drive teeth 26, which each have a drive flank 27 and a rear flank 28. The drive arm 6 has an elongated hole 25, in which a blocking element 24 an move. The blocking element 24 can assume a force transmission position, in which it abuts against the drive flank 27, so that a pivoting movement of the drive arm can be converted into a rotational movement of the first wheel 5. The blocking element 24 can also assume a release position, in which the drive wheel 29 can rotate freely.

A toothing 7 of the gear wheel 5 engages with a toothing 8 of a second wheel 4, which can be rotated about an axis of rotation 16. A toothing 9 of the cutting blade 3, which is supported so as to be able to pivot about a pivot axis 2 on the frame 1, also engages with the same toothing 8. The pivoting movement of the cutting blade 3 is limited between two end positions by means of a stop pin 32, which engages with a curved slot 31 of the cutting blade 3.

A coupling member 20 is formed by two tension rods, which each have an elongate, in particular rectilinear shape. The coupling member 20 is in particular a tension element comprising an elongated hole 21, which extends in the direction of extension thereof and with which a follower engages, which is formed by a fastening member 22, by means of which the two tension elements 20 are fastened to the two broad sides of the cutting blade 3, which face away from one another. During a pivoting movement of the drive arm 6, the follower can move in the elongated hole 21 by forming a clearance. The elongated hole 21 has a first end 21', which delimits the clearance towards one direction. On the opposite end 21", the elongated hole 21 has a region with an enlarged diameter, which forms an assembly opening. The first fastening member 22 does not get into the region of the end 21' during the pivoting movement of the cutting blade, so that the clearance is slightly smaller than the distance of the two ends 21', 21".

On the end located opposite the elongated hole 21, a further fastening member 23 is provided, which, in the exemplary embodiment, is formed by the blocking element 24, which is formed as round bolt. At this fastening member 23, the coupling member 20 is fastened to the blocking element 24, so that, depending on the pivot position of the drive arm 6, the coupling member 20 is able to exert a force, which points in another direction, based on the direction of extension of the elongated hole 25, so that the blocking element 24 can either be displaced into its force transmission position or into its release position, as a function of the pivot angle of the drive arm 6. The force is furthermore also a function of the pivoting direction of the drive arm 6.

On the top side, which forms the bearing 11, of the two carriers 33, which are formed by the frame 1, a stop element is furthermore located, which forms a stop 12, against which a workpiece to be cut can be placed. During a cutting movement of the cutting blade 3, during which the curved cutting edge 3' of the cutting blade 3 plunges into the gap 10 between the two carriers 33, a point of intersection of the cutting edge 3' with the bearing 11 moves in the direction of the stop 12.

The mode of operation of the cutting device is as follows:

In a storage position illustrated in FIG. 4, the cutting blade 3 assumes its cutting end position, in which the stop pin 32 lies on the end of the curved slot 31. The cutting edge 3' is plunged completely into the space between the two carriers 33. The blocking element 24 can be disengaged from the drive teeth 26. It is in its release position. A stop in 34 is supported on the cutting blade 3, so that the drive arm 6 runs parallel to the carrier 33. If the drive arm 6 is moved from this storage position into the position illustrated in FIG. 5 in backward pivoting movement R, the fastening member 22 moves through the elongated hole 21 until it has reached the end 21'. The drive arm 6 is now pivotably displaced during this pivoting movement, but not the cutting blade 3.

Figure 6:
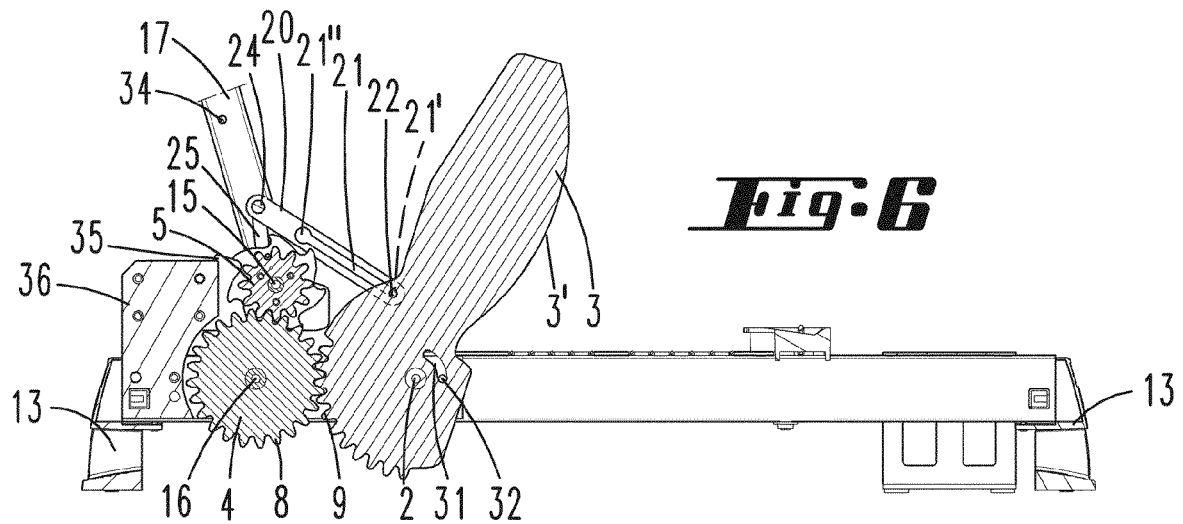
FIG. 6 shows a follow-up illustration, according to which the drive arm 6 has been pivoted further and has thereby also pivoted the cutting blade 3 into an initial position via the coupling member 20.

If the drive arm 6 is pivoted further from the position illustrated in FIG. 5 in backward pivoting movement R, the end 21' of the elongated hole 21 engages with the fastening member 22 and exerts a torque on the cutting blade 3, so that the latter is pivoted all the way into the pivot position illustrated in FIG. 6 as part of the pivoting movement of the drive arm 6. In this position, the cutting blade 3 assumes its initial position. The stop pin 32 lies on the other end of the curved slot 31. During this pivoting movement, the elongated hole 25 has an obtuse angle to the direction of extension of the coupling member 20, so that the tensile force applied by the coupling member 20 to the blocking element 24 holds the blocking element 24 in the release position. It turns out to be advantageous thereby when the direction of extension of the elongated hole 25 runs obliquely to the direction of extension of the drive arm 6.

Figure 7:
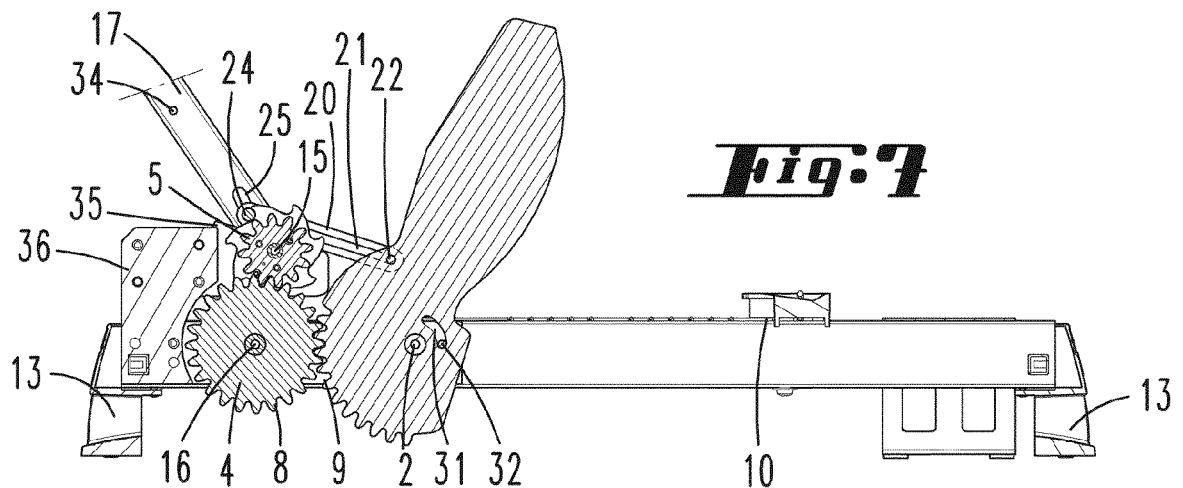
FIG. 7 shows a follow-up illustration, in which the drive arm has been pivoted beyond this pivot position into a pivot end position, in which the blocking element 24 has displaced back into the force transmission position.

If, based on the open position illustrated in FIG. 6, the drive arm 6 is pivoted further in backward pivoting movement R, the blocking element 24 can thus move into the force transmission position, which is shown in FIG. 7, because the direction of extension of the elongated hole 25 now runs at an acute angle to the direction of extension of the coupling member 20.

The force transmission position, however, can also be reached in that, starting at the open position illustrated in FIG. 6, the drive arm 6 is displaced in backward pivoting movement H. The acute angle in FIG. 6 then becomes an obtuse angle again.

If, based on FIG. 7, in which the blocking element 24 is in its force transmission position, thus abuts against a drive flank 27 of the drive tooth 26, the drive arm 6 is pivoted in backward pivoting movement H in the direction of the operating position illustrated in FIG. 8, the first wheel 5 of the reduction gear is rotated. The rotational movement of the gear wheel 5 is converted into the rotational movement of the gear wheel 4, which, in turn, transfers the rotational movement to the cutting blade 3, so that the cutting blade 3 pivots in the same direction of rotation as the drive arm 6. As part of this first cutting stroke, the follower, which is formed by the fastening member 22, moves away, within the elongated hole 21, from the first end 21' in the direction of the second end 21". The point of intersection of the cutting edge 3' with the bearing 11 moves in the direction of the stop 12.

If, based on the operating position illustrated in FIG. 8, the drive arm 6 is pivoted back in backward pivoting movement R, the blocking element 24 passes over the rear flank 28 of the drive tooth 26. During the backward pivoting movement, the follower formed by the fastening member 22, in turn, moves in the elongated hole 21. Said follower can thereby move all the way to the end 21'. The elongated hole 21 thus forms a pivoting movement clearance for the drive arm 6 during the cutting actuation.

Starting at the operating position illustrated in FIG. 8, the drive arm 6 can be pivoted back in backward pivoting movement H again in order to perform a second cutting stroke. The blocking element 24 thereby moves back in the force transmission position and can transfer the pivoting movement of the drive arm 6 to the first wheel 5 and via the reduction gear to the cutting blade 3, until the latter has reached the cutting end position illustrated in FIG. 10.

By means of a backward pivoting movement R, the drive arm can be brought back into the open position illustrated in FIG. 3 again, wherein the cutting blade 3 is pivoted back into the initial position by means of the cutting blade backward pivoting means according to the invention, which is formed essentially by the coupling member 20.

In the alternative, the drive arm 6, however, can also be brought from the operating position illustrated in FIG. 10 into the storage position illustrated in FIG. 1. Reference numeral 30 shows an outer edge of a bearing plate 35. It can be provided that said bearing plate acts as control shoulder in order to control the blocking element 24 or the coupling member 20 into a release position.

The above statements serve to describe the inventions, which are captured as a whole by the application, which further develop the prior art at least by means of the following feature combinations, in each case also independently, whereby two, several, or all of these feature combinations can also be combined, namely:

A cutting device, which is characterized by a cutting blade backward pivoting means 20, 21, 22, 23, by means of which the cutting blade 3, which is pivoted from an initial position into a cutting end position, can be brought back into the initial position by means of a backward pivoting movement.

A cutting device, which is characterized in that the cutting blade backward pivoting means has a coupling member 20, by means of which the drive arm 6 is coupled to the cutting blade 3 by forming a pivoting clearance.

A cutting device, which is characterized in that the coupling member 20 is a tension element, which is fastened to the cutting blade 3 by means of a first fastening member 22 and to the drive arm 6 by means of a second fastening member 23.

A cutting device, which is characterized in that the pivoting clearance is formed by a fastening member 22, 23, which can be moved in a first elongated hole 21 of the coupling member 20.

A cutting device, which is characterized in that the coupling member 20 is fastened to a blocking element 24, which couples the drive arm 6 to a first wheel 5 of the reduction gear during the backward pivoting movement H.

A cutting device, which is characterized in that the blocking element 24 can be displaced in a second elongated hole 25 of the drive arm 6 between a force transmission position at a drive flank 27 of a drive gear wheel 26 and a release position.

A cutting device, which is characterized in that during a backward pivoting movement R, a rearward flank 28 of the drive tooth 26 displaces the blocking element 24 from its force transmission position into its release position, in which it remains so as to entrain during the backward pivoting movement R of the cutting blade 3 from the cutting end position into the initial position by means of the coupling member 20.

A cutting device, which is characterized in that the cutting blade 3, based on its pivot axis 2, has a first arm, which has a cutting edge 3', which plunges into a gap 10 of the frame 1 during the cutting pivoting movement, and has a second arm, which is located essentially diametrically opposite to the first arm and which has a toothing 9, with which a toothing 8 of a second wheel 4 of the reduction gear engages.

A cutting device, which is characterized in that an output toothing of the first wheel 5 engages with the same toothing 8 of the second wheel 4, which meshes with the toothing 9 of the cutting blade 3 and/or that the first wheel 5 is arranged between two drive wheels 29 and/or that the pivot angle of the cutting blade 3 is pivotably limited by means of pivot limiting elements 31, 32 and/or that the blocking element 24 can be displaced from the force transmission position into a release position, so that the drive arm 6 can be brought into a parallel position with respect to a carrier formed by the frame 1.

All of the disclosed features are (alone, but also in combination with one another) are essential for the invention. The disclosure content of the corresponding/enclosed priority documents (copy of the prior application) is hereby also included in its entirety into the disclosure of the application, also for the purpose of adding features of these documents into claims of the present application. With their features, the subclaims, also without the features of a referenced claim, characterize independent inventive further developments of the prior art, in particular to file divisional applications on the basis of these claims. The invention specified in each claim can additionally have one or several of the features specified in the above description, in particular provided with reference numerals and/or specified in the list of reference numerals. The invention also relates to designs, in the case of which individual features, which are mentioned in the above description, are not realized, in particular insofar as they are discernibly expendable for the respective intended purpose or can be replaced by other technically identical means.

| List of Reference Numerals | |
| --- | --- |
| 1 | frame |
| 2 | pivot axis |
| 3 | cutting blade |
| 3' | cutting edge |
| 4 | reduction gear, second wheel |
| 5 | reduction gear, first wheel |
| 6 | drive arm |
| 7 | toothing |
| 8 | toothing |
| 9 | toothing |
| 10 | gap |
| 11 | bearing |
| 12 | stop |
| 13 | foot |
| 14 | bearing block |
| 15 | pivot axis |
| 16 | axis of rotation |
| 17 | strip |
| 18 | handle |
| 19 | |
| 20 | cutting blade backward pivoting means, coupling member |
| 21 | cutting blade backward pivoting means, elongated hole |
| 21' | end |
| 21" | end |
| 22 | cutting blade backward pivoting means, first fastening member |
| 23 | cutting blade backward pivoting means, second fastening member |
| 24 | blocking element |
| 25 | elongated hole |
| 26 | drive gear wheel |
| 27 | drive flank |
| 28 | rear flank, flank |
| 29 | drive wheel |
| 30 | control shoulder |
| 31 | curved slot |
| 32 | stop pin |
| 33 | carrier |
| 34 | stop pin |
| 35 | bearing plate |
| 36 | spacer plate |
| H | forward pivoting movement |
| R | backward pivoting movement |

The invention claimed is:

1. A cutting device, comprising: a frame; a cutting blade fastened to the frame so as to be pivotable about a first pivot axis; a reduction gear that converts forward pivoting movement of several successively performed forward and backward pivoting movements of a drive arm into a cutting pivoting movement of the cutting blade by a blocking element that is displaceable between a force transmission position at a drive flank and a release position, wherein the cutting blade is pivotable from an initial position into a cutting end position; and a cutting blade backward pivoting means for bringing the cutting blade back into the initial position, wherein the cutting blade backward pivoting means includes a coupling member fastened to the blocking element, the coupling member couples the drive arm to the cutting blade so that the cutting blade can be brought back into the initial position by a backward pivoting movement of the drive arm, wherein the blocking element is displaceable in an elongated hole in the drive arm and couples the drive arm during forward pivoting movements to a first wheel of the reduction gear in a force transmission position.

2. The cutting device according to claim 1, wherein the cutting blade backward pivoting means is configured so that the cutting blade is brought from the cutting end position back into the initial position by a single backward pivoting movement of the drive arm.

3. The cutting device according to claim 1, wherein the coupling member establishes an entraining connection of the drive arm to the cutting blade by forming a pivoting clearance.

4. The cutting device according to claim 3, wherein the pivoting clearance is formed by a fastening member that is movable in a first elongated hole of the coupling member.

5. The cutting device according to claim 1, wherein the coupling member is a tension element that is fastened to the cutting blade by a first fastening member and to the drive arm by a second fastening member.

6. The cutting device according to claim 1, wherein during a backward pivoting movement, a rearward flank of a drive gear wheel displaces the blocking element from the force transmission position into the release position, in which the blocking element remains so as to entrain during the backward pivoting movement of the cutting blade from the cutting end position into the initial position by the coupling member.

7. The cutting device according to claim 1, wherein the cutting blade, based on the first pivot axis, has a first arm, which has a cutting edge, that plunges into a gap of the frame during the cutting pivoting movement, and has a second arm that is located essentially diametrically opposite to the first arm and has a toothing that engages with a toothing of a second wheel of the reduction gear engages.

8. The cutting device according to claim 7, wherein an output toothing of the first wheel engages with the toothing of the second wheel that meshes with the toothing of the cutting blade.

9. The cutting device according to claim 1, wherein the first wheel is arranged between two drive wheels.

10. The cutting device according to claim 1, further comprising pivot limiting elements that pivotally limit a pivot angle of the cutting blade.

11. The cutting device according to claim 1, wherein the blocking element is displaceable from the force transmission position into the release position so that the drive arm is brought into a parallel position with respect to a carrier formed by the frame.

\* \* \* \* \*